United States Patent [19]
Jette

[11] Patent Number: 6,141,294
[45] Date of Patent: Oct. 31, 2000

[54] DATA ACQUISITION SYSTEM INCLUDING DATA TRANSMISSION CONTROLLER FOR OCTAVELY NESTED ACOUSTIC LINE ARRAYS

[75] Inventor: Steven D. Jette, Exeter, R.I.

[73] Assignee: The United States of America as represented by the Secretary of the Navy, Washington, D.C.

[21] Appl. No.: 09/272,744

[22] Filed: Mar. 10, 1999

[51] Int. Cl.[7] .................................................... H04B 1/06
[52] U.S. Cl. ............................................................ 367/135
[58] Field of Search ............................. 367/135; 342/195

[56] References Cited

U.S. PATENT DOCUMENTS 5,179,542    1/1993   Reese et al. .............................. 367/135

*Primary Examiner*—Daniel T. Pihulic
*Attorney, Agent, or Firm*—Michael J. McGowan; Prithvi C. Lall; Michael F. Oglo

[57] ABSTRACT

A data acquisition system receives an analog input signal comprising a plurality of octavely-nested components including a base octave and a selected number of higher-level octaves, and transmits digital data words representative of each component over a channel. The data acquisition system includes a data transmission system and an interface. The data transmission controller generates transmission strobes signals defining a series of octave transmission cycles each associated with one of said octaves, each octave transmission cycle having a series of octave strobe states including at least one octave strobe state associated with the base octave and successively higher numbers of octave strobe states associated with successively higher-level octaves. The transmission strobe states associated with each octave are uniformly distributed during each octave transmission cycle. The data transmission controller generates, during each octaves strobe state, transmission strobe signals identifying an octave associated with said octave strobe state. The interface receives the analog input signal and generating digital words in response thereto for each of the octavely-nested components, the interface transmitting the digital words over said channel for a component corresponding to an octave identified by the transmission strobe signals from the data transmission controller.

4 Claims, 4 Drawing Sheets

DATA ACQUISITION SYSTEM INCLUDING DATA TRANSMISSION CONTROLLER FOR OCTAVELY NESTED ACOUSTIC LINE ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The invention relates generally to the field of digital data transmission systems and more particularly to a controller for controlling transmission of octavely nested digital data.

(2) Description of the Prior Art

Systems for measuring acoustic radiated noise in, for example, an ocean environment, include transducers or sensors for sensing the acoustic energy and converting the acoustic energy to analog electrical signals, and equipment for converting the analog signals to digital data words for transmission to data processing equipment for processing. Generally, such systems have generally been limited either to a few sensors of limited acoustic bandwidth or unvarying sampling rates for the analog to digital conversion. For planar sensor arrays, digitizing and multiplexing systems have been developed which generate digital data words in response to analog signals from acoustic sensors organized in a planar array and multiplex the digital data words at a single, or only a few, channel data rates for transmission to the data processing equipment. However, such systems are insufficient for handling arrays in which the signals form the sensors contain octavely-nested components which should be transferred to the data processing equipment at varying data rates depending on the respective octaves.

SUMMARY OF THE INVENTION

It is therefore an object of the invention to provide a new and improved data acquisition system including a data transmission controller for controlling transmission of octavely nested digital data.

In brief summary, the data acquisition system receives an analog input signal comprising a plurality of octavely-nested components including a base octave and a selected number of higher-level octaves, and transmits digital data words representative of each component over a channel. The data acquisition system includes a data transmission system and an interface. The data transmission controller generates transmission strobe signals defining a series of octave transmission cycles each associated with one of said octaves, each octave transmission cycle having a series of octave strobe states including at least one octave strobe state associated with the base octave and a successively higher numbers of octave strobe states associated with successively higher-level octaves. The transmission strobe states associated with each octave are uniformly distributed during each octave transmission cycle. The data transmission controller generates, during each octave strobe state, transmission strobe signals identifying an octave associated with said octave strobe state. The interface receives the analog input signal and generating digital words in response thereto for each of the octavely-nested components, the interface transmitting the digital words over said channel for a component corresponding to an octave identified by the transmission strobe signals from the data transmission controller.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
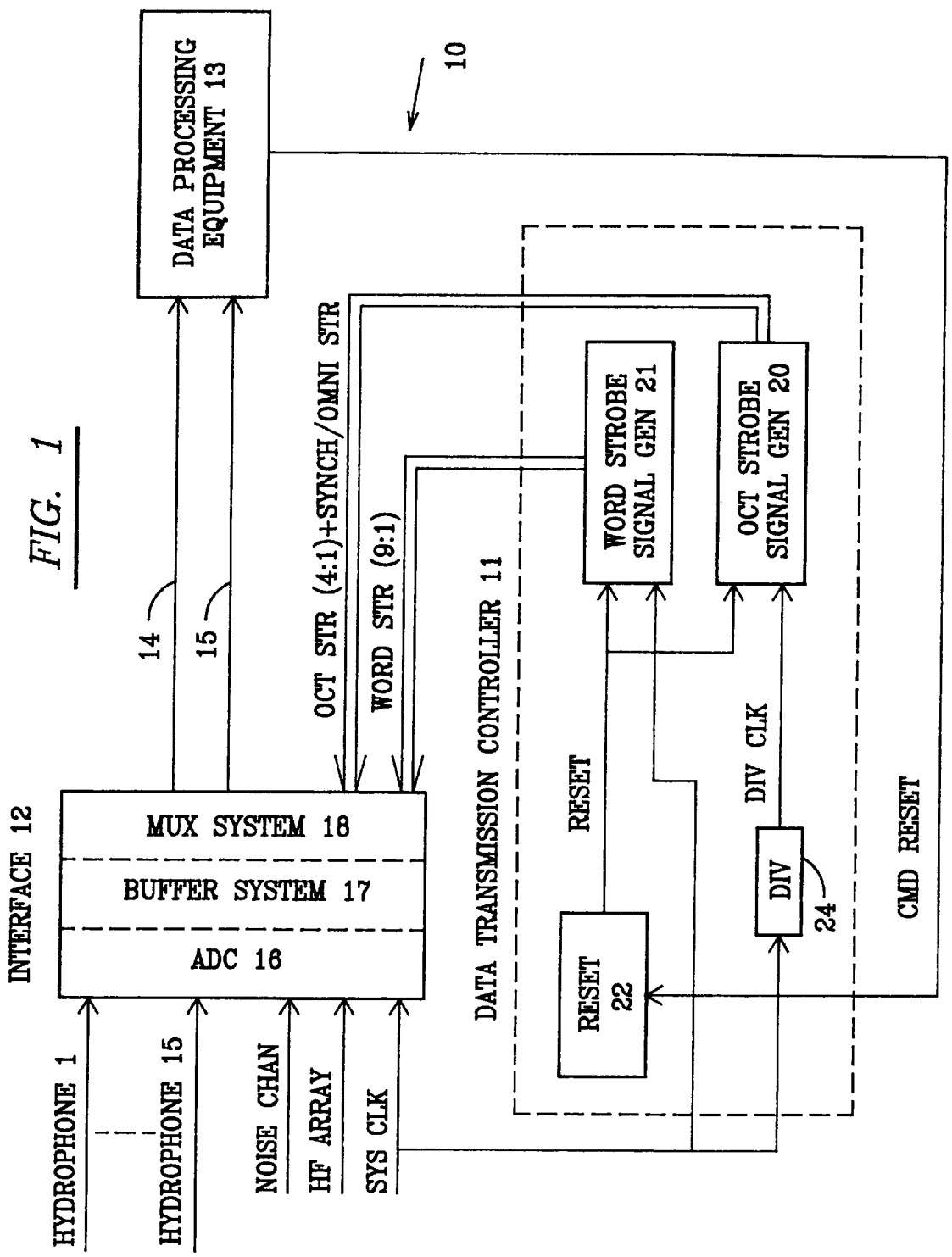
FIG. 1 is a general block diagram of a data acquisition system including a data transmission controller constructed in accordance with the invention.

FIG. 1 is a general block diagram of a data acquisition system 10 including a data transmission controller 11 constructed in accordance with the invention. With reference to FIG. 1, the data acquisition system 10 includes, in addition to the data transmission controller 11, an interface circuit 12 and data processing equipment 13. The interface circuit 12 receives data input signals from a number of signal sources, digitizes them to create digital words representative of respective amplitudes as described below and provides the digital words to the data processing equipment 13 over two channels 14 and 15.

In one embodiment, the signal sources include a selected number of acoustic sensing devices (not shown) in, for example, an ocean environment, and the data acquisition system 10 processes the data to develop information concerning, for example, movements of objects, such as ships, moving through the environment. In another embodiment, the signal sources include hydrophones, which, in a conventional manner, provide analog electrical signals representative of acoustic signals that they sense in the environment. In another embodiment, the interface 12 receives analog signals from fifteen hydrophones and a high frequency array. The signals provided by the hydrophones are identified in FIG. 1 as HYDROPHONE 1 through HYDROPHONE 15 (generally identified as "HYDROPHONE i", where index "i" is an integer from one to fifteen). The analog signal from the highfrequency array, identified "HF ARRAY" in FIG. 1 is representative of a high frequency acoustic signal. In addition, the interface 12 receives an analog noise signal, identified "NOISE CHAN" in FIG. 1, which provides a background noise which may be used as a reference in processing the other signals.

The interface 12 receives the analog HYDROPHONE i, HF ARRAY and NOIST CHAN signals from the various sources noted above and converts them to digital form. The interface 12 may include conventional analog to digital converter circuitry 16, clocked by a system clock signal SYS CLK, for this purpose. The analog to digital converter circuitry 16 provides for each of the analog input signals a digital word representative of the amplitude of the analog signal, and loads the digital data words so generated into a buffer system 17. A multiplexer system 18, operating in response to control signals from the data transmission controller 11, couples the digital data words buffered by the buffer system 17 onto the channels 14 and 15 as described below.

In particular, each of the analog hydrophone signals HYDROPHONE i, actually comprises a set of octavely-nested components, and the analog to digital converter periodically provides, for each HYDROPHONE i, signal, a digital data word defining the amplitude of the octave components.

In one particular embodiment, the digital data word generated by the interface 12 (in particular, the analog to digital converter) from each HYDROPHONE i, signal comprises octavely-nested components, namely, a base component, identified herein as Octave (1), and three harmonic components identified as Octave (2), Octave (3) and Octave (4), with the digital data word defining the amplitude of the component as determined by the analog to digital converter circuitry 16. The interface 12 provides the Octave (i) digital data word components for the various octaves at appropriate time intervals. In general, if the interface 12 provides digital data words comprising the base Octave (1) component at a selected base time interval, the interface 12 will provide digital words comprising the Octave (2) component at a time interval one-half that of the base component Octave (1) (corresponding to a frequency of twice the frequency of the base component Octave (1)), digital words comprising the component at Octave (3) at a time interval one-fourth that of base component Octave (1) (corresponding to a frequency of four times the frequency of the base component Octave (1)) and digital words comprising the component at Octave (4) at a time interval one-eighth that of base component Octave (1) (corresponding to a frequency of eight times the frequency of the base component Octave (1)). In addition, the interface 12 provides, along with the digital data words from each hydrophone, either a synchronizing component or an omniphone component, which is also provided at the Octave (1) interval.

As described above, the interface 12 also receives the analog HF ARRAY high-frequency array and NOISE CHAN noise channel signals, and generates corresponding digital words in response. The digital data word generated by the interface 12 in response to the analog NOISE CHAN signal is provided with Octave (1) through Octave (4) components at the appropriate intervals, in the same manner as the HYDROPHONE i signals. The digital data words generated by the interface in response to the analog HF ARRAY signal correspond to only a single Octave (5) component at an interval one-sixteenth that of the base component Octave (1) (corresponding to a frequency sixteen times that of the base Octave (1) component).

As noted above, the interface 12 transfers the digital data words to the data processing equipment 13 over channels 14 and 15 related to the respective Octave (i) in a selected sequence to ensure that they are properly nested and that none of the data words are lost, while minimizing the need for buffering. In particular, the interface 12, under control of the data transmission controller 11, transmit data words from the various octaves in the octave order sequence Octave (4)-Octave (3)-Octave (4)-Octave (2)-Octave (4)-Octave (3)-Octave (4)-Octave (1)-Octave (4)-Octave (3)-Octave (4)-Octave (2)-Octave (4)-Octave (3)-Octave (4), which, along with a synch/omni word generated in response to the synchronizing or omniphone component transmitted prior to the first Octave (4) component, defines the sixteen octave strobe states of what will be referred to herein as an "octave transmission cycle." Thus, an "octave transmission cycle" comprises sixteen successive states, including fifteen successive states noted above for the digital data words for signal components Octave (1) through Octave (4) followed by a state for the synch/omni word (for the synchronizing or omniphone word). It will be appreciated that the Octave (5) component generated by the analog to digital converter system 16 in response to the HF ARRAY signal will require sixteen states, and so the sixteen state octave transmission cycle will also accommodate the Octave (5) component, with the interface 12 transmitting one digital word of the Octave (5) component during each state contemporaneous with the transmission of a digital data word for another octave or the synch/omni word (during the last octave strobe state).

The interface 12 will, while it is enabled by the data processing equipment 13, repetitively transmit data words from the various Octave (1) components in sequences corresponding to the above-defined octave transmission cycle. It will be appreciated that, during one octave transmission cycle, the interface 12 will transmit digital words for the Octave (1) component once, digital words for the Octave (2) component twice, digital words for the Octave (3) component four times, digital words for the Octave (4) component eight times, and digital words for the Octave (5) component sixteen times, which is the required relative periodicity required for the various components. In addition, the sequence is designed to ensure that the transmission times for the various Octave (i) components are evenly distributed throughout a single octave transmission cycle and through successive such cycles.

As noted above, the interface 12 is connected to data processing equipment 13 over two channels 14 and 15. Furthermore, the multiplexer system 18 (FIG. 1) of interface 12 couples the buffered digital words from the buffer system 17 onto the channels 14 and 15. It will be appreciated that, since two channels 14 and 15 are provided, the multiplexer system 18 can transmit two digital words simultaneously, one digital word over each channel 14 and 15. Since there are seventeen analog input signals to the interface 12, namely, the HYDROPHONE 1 through HYDROPHONE 15 signals, the HF ARRAY high-frequency array signal and the NOISE CHAN noise channel signal, and there are two channels 14 and 15 connecting the interface 12 to the data processing equipment 13, during each of the octave strobe states of an octave transmission cycle, the interface 12 will need to transfer digital words in nine successive word strobe states during each octave transmission cycle. Since there are an odd number (seventeen) of inputs, it will be appreciated that (i) during eight of the word strobe states the multiplexer system 18 will couple digital data words for two of the inputs over the channels 14 and 15, so that digital data words for sixteen of the inputs will be coupled over the channels 14 and 15, and (ii) during the ninth word strobe state the multiplexer system 18 will couple a digital data word for the seventeenth input over one of the channels 14 or 15, and the other channel will be blank.

Figure 2:
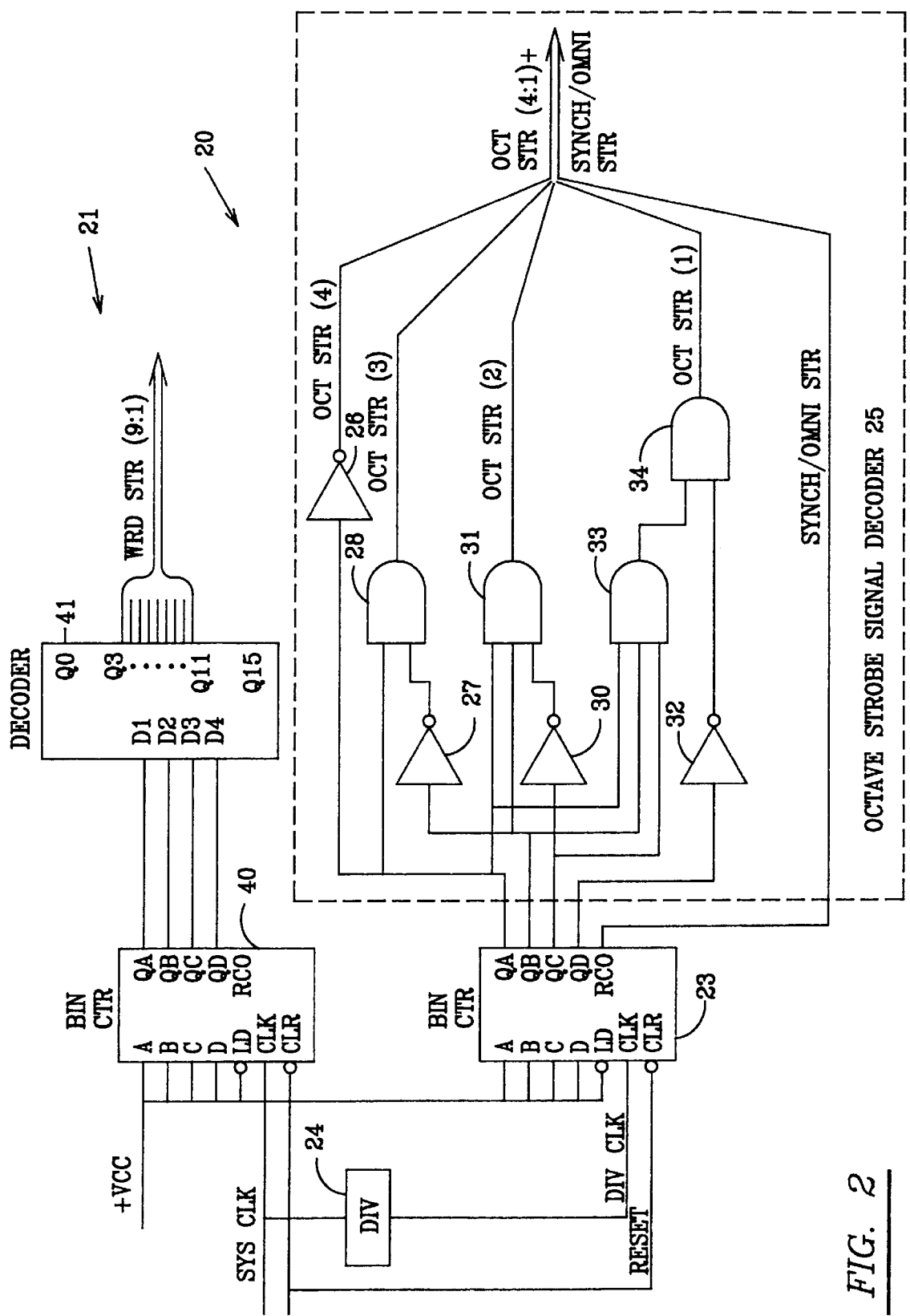
FIG. 2 is a logic diagram of circuit comprising a portion of the data transmission controller depicted in FIG. 1.
Figure 3:
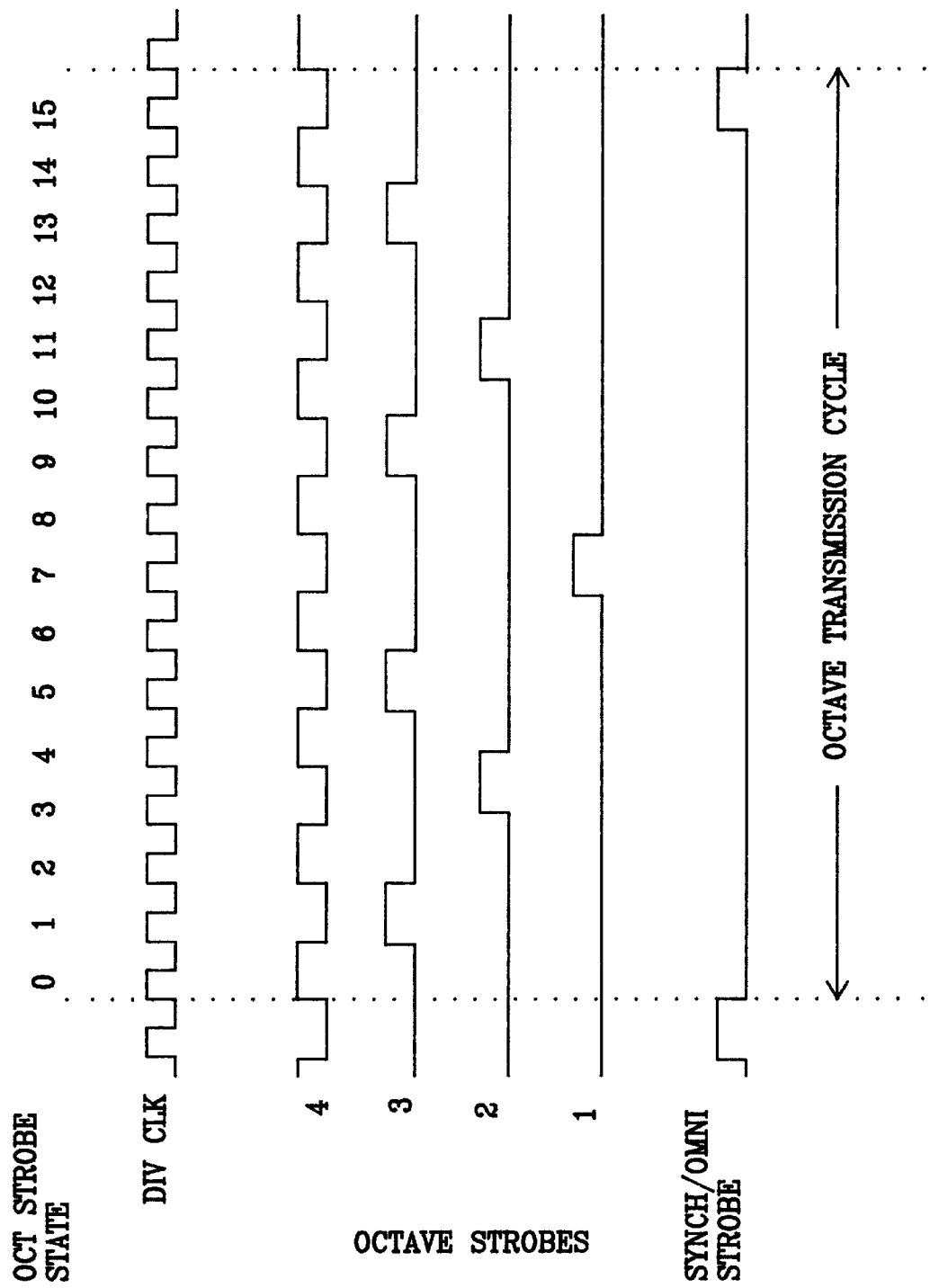
FIGS. 3 and 4 are timing diagrams useful in understanding the operation of the circuit depicted in FIG. 2.
Figure 4:
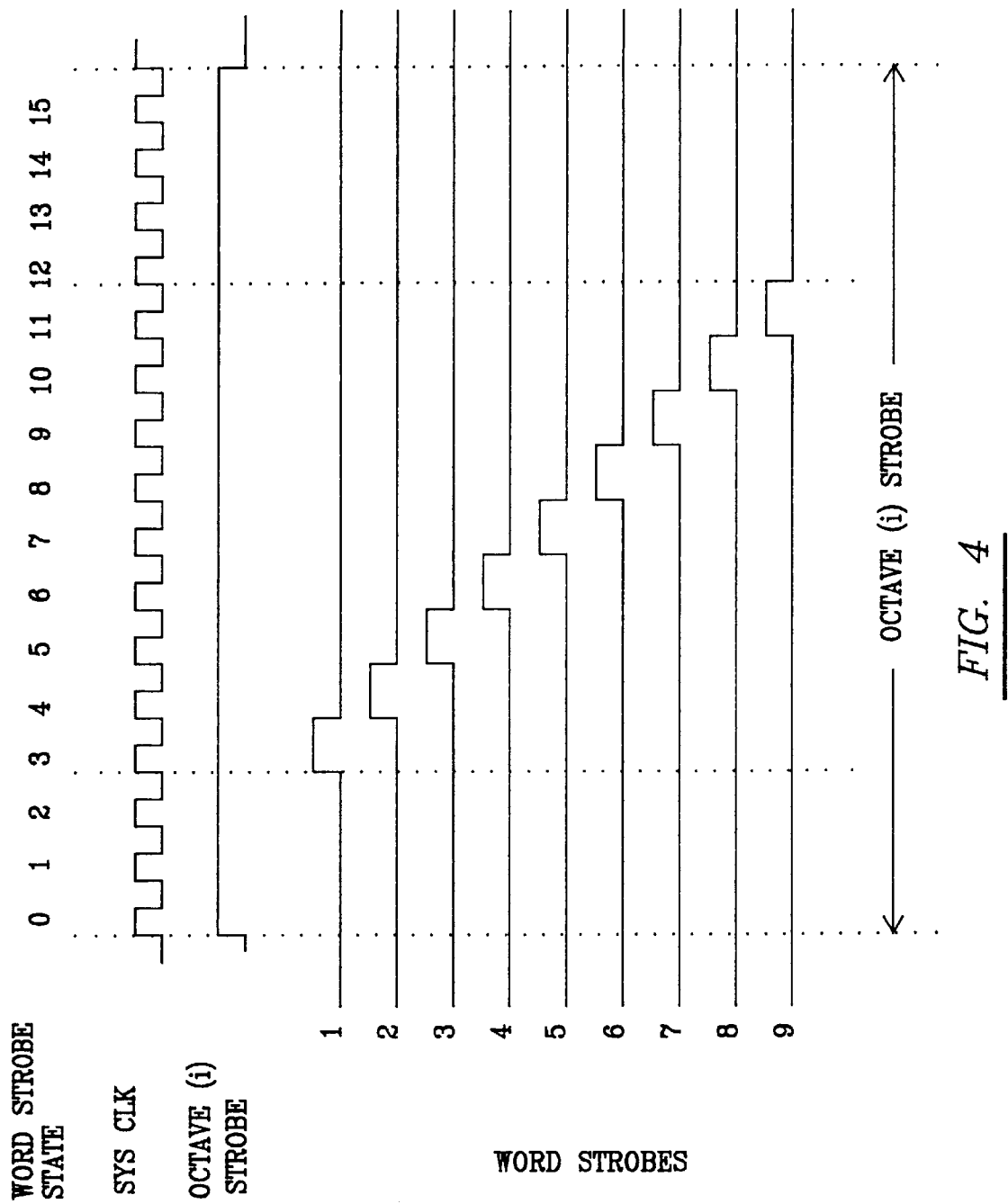

The data transmission controller 11 contains circuitry that generates signals for controlling the interface 12 in transmitting the various digital words over the channels 14 and 15 in accordance with the respective octave strobe states of each octave transmission cycle, and in accordance with the respective word strobe states. FIG. 2 depicts a logic diagram of data transmission controller 11, and FIGS. 3 and 4 depict timing diagrams that are useful in understanding the operation of the data transmission controller 11. The data transmission controller 11 includes an octave strobe signal generating portion 20 and a word strobe signal generating portion 21, both operating in response to the SYS CLK system clock signal, circuits for both of which are shown of FIG. 2. The data transmission controller 11 also includes a reset circuit 22 (shown on FIG. 1) that resets the octave strobe signal generating portion 20 and the word strobe signal generating portion 21 in response to a power up condition when power is first applied to the data transmission controller, and in response to a command reset CMD RESET from the data processing equipment 13.

With reference to FIG. 2, the octave strobe signal generating portion 20 includes a binary counter 23 and an octave strobe signal decoder 24. The binary counter 23, in response to a DIV CLK divided clock signal generated by a clock divider 24, generates binary-encoded output signals that it transmit through its output terminals QA through QD to the octave strobe signal decoder 25. The octave strobe signal encoder, in turn, decodes the binary-encoded output signals from the binary counter 23 and generates OCT STR (4:1) octave strobe signals to define the fifteen octave strobe states for octaves Octave (4) through Octave (1). In addition, the binary counter 23 generates a signal through its RCO carry output terminal that the octave strobe signal decoder 25 uses to generate an SYNCH/OMNI STR synch/omni strobe signal to define the synch/omni state. With reference further to FIG. 3, the DIV CLK divided clock signal provided to the binary counter 23 defines the sixteen octave strobe states, identified as states zero through fifteen at the top of the FIG. 3.

As noted above, the binary counter 23 generates the QA through QD signals through the respective terminals as binary-encoded signals whose patterns of assertion and negation identify, in binary-encoded form, the sixteen octave strobe states. The QA signal provides the low-ordered signal representing the least-significant digit in the binary-encoded identification of the octave strobe states in the binary encoding, and the QD signal provides the high-ordered signal representing the most-significant digital in the binary encoding. Accordingly, the binary counter 23 negates its low-ordered QA output signal in response to the assertion of the DIV CLK signal at the beginning of the zeroth state and every even-numbered state, and asserts the QA signal in response to the assertion of the DIV CLK signal at the beginning of every odd-numbered octave strobe state. Thus, the QA signal remains asserted for one cycle of the DIV CLK divided clock signal, and it also remains negated for one cycle of the DIV CLK divided clock signal. The assertion and negation patterns of each of the other output signals QB through QD are also based on the assertion of the DIV CLK signal and the particular order in the binary encoding of the octave strobe state as represented by the output signal. Accordingly, binary counter 23 asserts the second-low-ordered QB output signal at the beginning of octave strobe states two, six, ten and fourteen, and maintains it in an asserted state for two cycles of the DIV CLK signal. The binary counter 23, after negating the QB output signal at the beginning of octave strobes states four, eight, twelve and zero (at the end of the octave transmission cycle), holds the QB signal in a negated state for two cycles of the DIV CLK signal.

In a similar manner, the binary counter 23 asserts and negates each of the two higher high-ordered signals in a pattern that is at successively halved frequencies and for successively doubled periods. Accordingly, the binary counter 23 asserts the high-ordered QD signal once, at the beginning of octave strobe state eight, and maintains it in an asserted condition for eight cycles of the DIV CLK divided clock signal, until the end of the octave transmission cycle, at which time the high-ordered QD signal is negated. The binary counter 23 asserts the RCO carry output signal coincident with the octave strobe state fifteen to indicate that the counter has counted out.

The octave strobe signal decoder 25 receives the QA through QD and RCO output signals from the binary counter 23 and generates the OCT STR (4:1) octave strobe signals and the SYNCH/OMNI STR synch/omni Strobe signals for transmission to the interface 12 (FIG. 1). The octave strobe signal decoder 25 includes an inverter 26 that receives the QA and complements it to form the OCT STR (4) octave (4) strobe signal defining the Octave (4) octave strobe state. As indicated above, the QA output signal from binary counter 23 is asserted during the even-numbered octave strobe states and negated during the zeroth and odd-numbered octave strobe states, and so the OCT STR (4) octave (4) strobe signal will be asserted during the zeroth and odd-numbered octave strobe states and negated otherwise, as shown in FIG. 3. Accordingly, octave strobe signal decoder 25 will assert the OCT STR (4) signal eight evenly-spaced times during the octave transmission cycle to enable transmission of the digital words comprising the Octave (4) signal components, as shown on FIG. 3.

Similarly, the octave strobe signal decoder 25 includes an inverter 27 and an AND gate 28 that cooperate to generate the OCT STR (3) octave (3) strobe signal. The AND gate 28 receives, at one input, the QA output signal from binary counter 23 and the complement of the QB output signal as generated by the inverter 27. The AND gate 28 thus asserts the OCT STR (3) octave (3) strobe signal in response to the coincidence of the assertion of the QA output signal and the negation of the QB output signal from the binary counter 23. Thus, the OCT STR (3) octave (3) strobe signal will be asserted during the octave strobe states one, five, nine and thirteen. Accordingly, octave strobe signal decoder 25 will assert the OCT STR (3) signal four evenly-spaced times during the octave transmission cycle to enable transmission of the digital words comprising the Octave (3) signal components, as shown on FIG. 3.

Similarly, the octave strobe signal decoder 25 includes an inverter 30 and an AND gate 31 that cooperate to generate the OCT STR (2) octave (2) strobe signal. The AND gate 31 receives, at two inputs, the QA and QB output signals from binary counter 23 and the complement of the QC output signal as generated by the inverter 30. The AND gate 31 thus asserts the OCT STR (2) octave (2) strobe signal in response to the coincidence of the assertion of the QA and QB output signals and the negation of the QC output signal from the binary counter 23. Thus, the OCT STR (2) octave (2) strobe signal will asserted during the octave strobe states three and twelve. Accordingly, octave strobe signal decoder 25 will assert the OCT STR (2) signal two evenly-spaced times during the octave transmission cycle to enable transmission of the digital words comprising the Octave (2) signal components, as shown on FIG. 3.

Finally, the octave strobe signal decoder 25 includes an inverter 32 and two AND gates 33 and 34 that cooperate to generate the OCT STR (1) octave (1) strobe signal. The AND gate 33 receives at its inputs, the QA, QB and QC output signals from binary counter 23 generates an asserted signal when they are all asserted, which occurs during octave state states seven and fifteen. The AND gate 34 receives the output signal from the AND gate 33 and the output signal form inverter 32, which corresponds to the complement of the QD output signal from the binary counter 23. The QD output signal from binary counter 23 is negated during octave strobe states zero through seven, and is asserted during octave strobe states eight through fifteen, and so the inverter 32 generates as asserted signal only during states zero through seven. Since AND gate 34 generates the asserted OCT STR (1) signal in response to the coincidence of the asserted output signal from AND gate 34 (asserted during octave strobe states seven and fifteen) and the asserted output signal from inverter 32 (asserted during octave strobe states zero through seven), it follows and AND gate 34 will assert the OCT STR (1) signal during only octave strobe state seven, as shown on FIG. 3.

In addition, since the binary counter 23 asserts the RCO carry output signal only during the fifteenth octave strobe state, the octave strobe signal decoder will couple that signal directly as the SYNCH/OMNI STR signal. Accordingly, the octave strobe signal decoder 25 provides that the SYNCH/OMNI STR signal will only be asserted during state fifteen as shown in FIG. 3.

Accordingly, it will be appreciated that the octave strobe signal decoder 25 will assert the four OCT STR (i) octave strobe signals and the SYNCH/OMNI signal with the required frequency and spacing during an octave transmission cycle, and further that the assertion pattern will be such that only one such signal is asserted during each of the sixteen octave strobe states.

As noted above, the data transmission controller 11 also includes a word strobe signal generating portion 21 comprising a binary counter 40 and a binary decoder 41. The binary counter 40 is essentially the same type of circuit as binary counter 23, except that it is clocked by the SYS CLK system clock signal instead of the DIV CLK divided clock signal. In a similar manner as with binary counter 23, the binary counter 40 generates QA through QD output signals that define sixteen binary-encoded states, and the counter, in response to successive assertions of the SYS CLK signal, successively asserts output signals QA through QD defining the sixteen states. The decoder 41 receives the QA through QD signals from the binary counter 40 and generates sixteen output signals Q0 through Q15, each associated with one of the states. Accordingly, as the binary counter 40 generates the QA through QD signals that successively step through the sixteen states, the decoder 41 asserts successive ones of its sixteen output signals Q0 through Q15. Nine successive ones of the output signals from decoder 41, namely, signals Q3 through Q11, are coupled to the interface 12 as the nine word strobe signals WRD STR (9:1) as described above.

It will be appreciated that the frequencies of the SYS CLK system clock signal and the DIV CLK divided clock signal are preferably selected so that, during each of the octave strobe states as generated by the octave strobe signal generating portion 20, the binary counter 40 of the word strobe signal generating portion 21 will sequence through all of its sixteen states. It will, accordingly, be appreciated that the divider 25 generates the DIV CLK divided clock signal to have a frequency one-sixteenth the frequency of the SYS CLK signal.

It will further be appreciated that the particular number of octave strobe states and word strobe states as generated by the data transmission controller is selected to conform to the requirements, as described above, of the particular embodiment of system 10 as depicted in FIG. 1. Circuitry for generating of octave strobe signals defining additional numbers of octave strobe states to accommodate higher order octave components will be, in consideration of the system 10 described herein, readily apparent to one skilled in the art.

In addition, it will be appreciated that, will the particular embodiment of the word strobe signal generating portion 21 is described above as generating nine word strobe states, the embodiment is clearly is capable of generating at least sixteen word strobe states, one word strobe state for each of the sixteen binary encodings of the signals generated by the binary counter 40 as decoded by the decoder 41. Furthermore, while, in the particular embodiment depicted in FIG. 2, the particular outputs of the decoder 41 used to define the nine word strobe states comprise the nine successive outputs as shown in FIG. 2, diverse ones of the outputs may be selected. In addition, it is readily apparent that circuitry may be provided for the word strobe signal generating portion 21 which is capable of generating diverse numbers of word strobe states.

The new data acquisition system 10 provides a number of advantages. In particular, the system provides an arrangement for coupling octavely-nested signal components over a limited number of channels to, for example, data processing equipment 13 for processing in an efficient manner, and avoiding the use of complicated buffering and multiplexing arrangements.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A digital data acquisition system for receiving an analog input signal comprising a plurality of octavely-nested components including a base octave and a selected number of higher-level octaves, and for transmitting digital data words representative of each component over a channel, the system comprising:

a data transmission controller for generating transmission strobe signals defining a series of octave transmission cycles each associated with one of said octaves, each octave transmission cycle having a series of octave strobe states including at least one octave strobe state associated with the base octave and a successively higher numbers of octave strobe states associated with successively higher-level octaves, the transmission strobe states associated with each octave being uniformly distributed during each octave transmission cycle, the data transmission controller generating during each octave strobe state transmission strobe signals identifying an octave associated with said octave strobe state; and an interface for receiving the analog input signal and generating digital words in response thereto for each of the octavely-nested components, the interface transmitting the digital words over said channel for a component corresponding to an octave identified by the transmission strobe signals from the data transmission controller.

2. A data acquisition system as defined in claim 1 in which the transmission strobe signals generated by said data transmission controller include a plurality of octave strobe signals, each of said plurality octave strobe signals being associated with one of the octaves, the interface transmitting in response to receipt of one of said octave strobe signals a digital word generated in response to a component for the one of said octave associated with the octave strobe signal.

3. A data acquisition system as defined in claim 2 in which the data transmission controller includes:

an octave state counter for generating octave state signals defining successive octave states an octave transmission cycle; and an octave state decoder for generating one of said octave strobe signals associated with an octave whose component is to be transmitted during the octave state identified by the octave state signals from the octave state counter.

4. A data acquisition system as defined in claim 1 in which, during each octave state, the interface successively transmits a series of data words, the data transmission controller further including a wording strobe signal generator for generating during each octave state a series of word strobe signals for enabling the interface to transmit successive ones of said data words in one of said series of data words.

* * * * *